US008223737B2

(12) United States Patent
Nangia et al.

(10) Patent No.: US 8,223,737 B2
(45) Date of Patent: Jul. 17, 2012

(54) ADAPTIVE DC SUB-CARRIER HANDLING IN A RECEIVER

(75) Inventors: Vijay Nangia, Algonquin, IL (US);
Kevin L. Baum, Rolling Meadows, IL (US); Brian K. Classon, Palatine, IL (US); Hyejung Jung, Schaumburg, IL (US); Robert T. Love, Barrington, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 900 days.

(21) Appl. No.: 12/137,695

(22) Filed: Jun. 12, 2008

(65) Prior Publication Data

US 2009/0310589 A1    Dec. 17, 2009

(51) Int. Cl.
H04B 7/208 (2006.01)
H04B 7/00 (2006.01)
H04B 1/00 (2006.01)
H04J 1/00 (2006.01)

(52) U.S. Cl. ........ 370/344; 370/310; 370/343; 455/63.1

(58) Field of Classification Search .................... 370/344
See application file for complete search history.

(56) References Cited

U.S. PATENT DOCUMENTS

| | | | | |
|---|---|---|---|---|
| 5,929,704 A * | 7/1999 | Proctor et al. | ............... | 330/149 |
| 2005/0111525 A1* | 5/2005 | Driesen et al. | ............... | 375/147 |
| 2007/0242599 A1* | 10/2007 | Gorday et al. | ............... | 370/208 |
| 2007/0254592 A1* | 11/2007 | McCallister et al. | ...... | 455/67.11 |
| 2009/0110087 A1* | 4/2009 | Liu et al. | ...................... | 375/260 |

OTHER PUBLICATIONS

3rd Generation Partnership Project, "3GPP TR 25.814 v2.0.0, Technical Specification Group Radio Access Network; Physical Layer Aspects for Evolved UTRA (Release 7)," 3GPP Organizational Partners, Jun. 2005, pp. Cover, 20-22 and 67-73.
IEEE Computer Society, "P802.16 Rev 2/D0b (Jun. 2007, Draft, Part 16: Air Interface for Broadband Wireless Access Systems," LAN/MAN Standards Committee of the IEEE Computer Society and the IEEE Microwave Theory and Techniques Society, Piscataway, New Jersy, USA Jun. 27, 2007, pp. Cover, 595-598 and 672-675.
Weidong Yang, "DFT S-OFDMA and OFDMA for Reverse Link," Motorola, 3rd Generation Partnership project 2 "3GPP2", Motorola, 2006, pp. 1-10.

* cited by examiner

Primary Examiner — Derrick Ferris
Assistant Examiner — Shripal Khajuria

(57) ABSTRACT

Receiving units will switch between performing a DC bias suppression and not removing the DC distortion at the receiver depending on the amount of DC interference level observed/measured/estimated. Since the overall DC interference is from all uplink transmitters, potentially at different power levels, the amount of DC distortion can be measured based on the difference between the received power level and the expected power level on the DC sub-carrier. Additionally it can be estimated based on the number of active transmitters, their allocation bandwidth, power control target and/or a rough estimate of the DC distortion introduced by each active transmitter and also the distortion introduced by the receiver. Once this distortion level is estimated, a decision is then made whether or not to remove the DC distortion.

22 Claims, 13 Drawing Sheets

ADAPTIVE DC SUB-CARRIER HANDLING IN A RECEIVER

FIELD OF THE DISCLOSURE

The present disclosure relates generally to wireless communications, and more particularly to handling the DC distortion adaptively in a receiver, to allocating a subset of sub-carriers from a superset including a DC sub-carrier to wireless communication terminals, and also to radio resource scheduling in wireless communication networks, corresponding entities and methods.

BACKGROUND

DFT-SOFDM is an OFDM-like single carrier modulation technique that is used in the EUTRA uplink (36.211 v8.2.0). DFT-SOFDM has significantly better power de-rating, which is also known as cubic metric or peak to average power ratio (PAPR) properties than OFDM, enabling better data rates near the cell edge and/or improved battery life in subscriber stations or user equipment (UE).

Unfortunately, direct conversion transmitters and receivers introduce distortion on the DC sub-carrier. On the uplink, the distortion includes unsuppressed carrier feed-through from all active user equipment in the uplink. The DC sub-carrier may be used for DFT-SOFDM transmissions. Allocations spanning the DC sub-carrier but not transmitting or skipping over the DC sub-carrier would suffer from increased CM (~1.7 dB for pi/2 BPSK, 0.7 dB for QPSK, and 0.5 dB for 16QAM for DC distortion power equal to the average sub-carrier power negating the low CM benefit of DFT-SOFDM. At the transmitter, both error vector magnitude (EVM) and the cubic metric (CM)/PAPR worsen with increased levels of DC distortion. In 3GPP EUTRA 36.211 v8.2.0, the transmitted signal is frequency shifted by ½ the sub-carrier spacing, prior to transmission so that the impact of the DC distortion due to local oscillator leakage can be distributed over sub-carriers adjacent to the DC sub-carrier.

Since DFT-SOFDM is a weighted sum of multiple data symbols (in contrast to conventional OFDM), degradation to the DC sub-carrier degrades receiver performance compared to an ideal DFT-SOFDM receiver with no DC distortion. Simply discarding (zeroing out) the DC sub-carrier at the receiver can cause 0.9 dB of degradation for 1 resource block (12 sub-carrier) allocations with 16QAM modulation. On the other hand, not discarding the DC subcarier results in significant degradation for high DC distortion values. Therefore, there is a need for improved DC sub-carrier handling in the receiver for DFT-SOFDM uplink.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
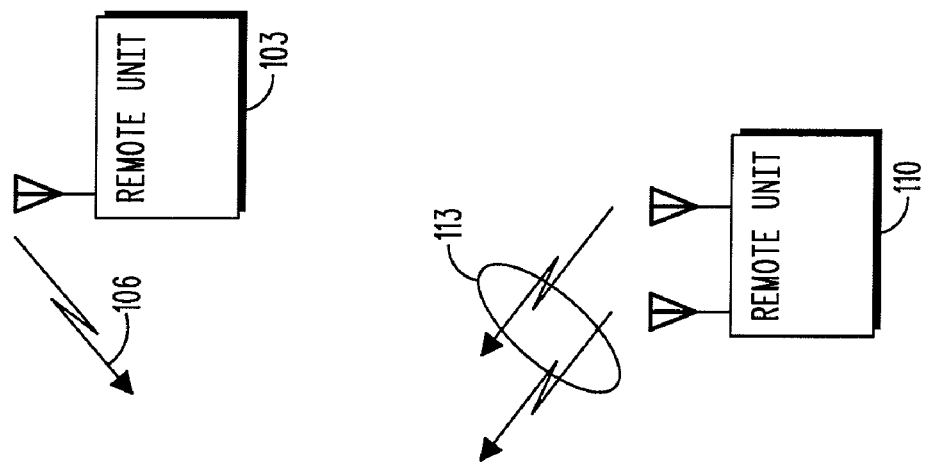
FIG. 1 illustrates a wireless communication system.
Figure 1:
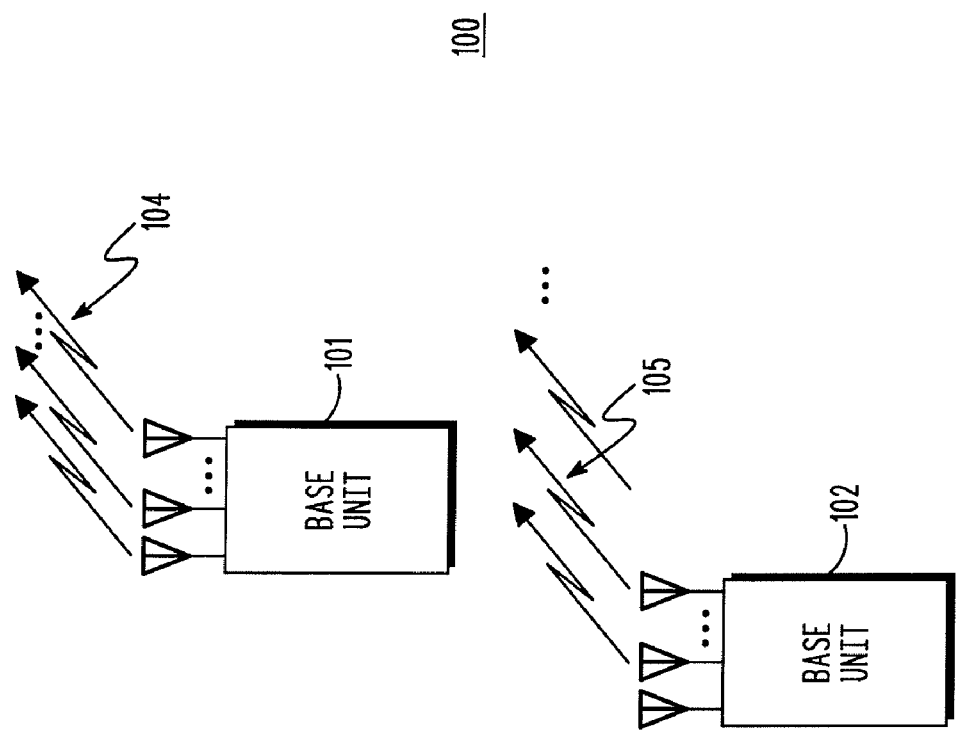

FIG. 1 is a wireless communication system 100 comprising a cellular network including multiple cell serving base stations distributed over a geographical region that utilizes pilot transmissions. In one embodiment, the communication system utilizes either OFDMA or a next generation single-carrier based FDMA (SC-FDMA) architecture for uplink transmissions, such as interleaved FDMA (IFDMA), Localized FDMA (LFDMA), DFT-spread OFDM (DFT-SOFDM) with IFDMA or LFDMA.

Single-carrier based FDMA approaches are attractive in that they optimize performance when assessed using contemporary waveform quality metrics, which may include peak-to-average power ratio (PAPR) or the so-called cubic metric (CM). These metrics are good indicators of power backoff or power de-rating necessary to maintain linear power amplifier operation, where "linear" generally means a specified and controllable level of distortion both within the signal bandwidth generally occupied by the desired waveform and in neighboring frequencies. While these SC-FDMA approaches can be classified as single-carrier based transmission schemes with a much lower peak-to average power ratio than OFDM, they can also be classified as multi-carrier schemes in the present disclosure because they are block-oriented like OFDM and can be configured to occupy only a certain set of "sub-carriers" in the frequency domain like OFDM. Thus IFDMA and DFT-SOFDM can be classified as both single-carrier and multi-carrier since they have single carrier characteristics in the time domain and multi-carrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and/or frequency division multiplexing/multiple access techniques, or a combination of these various techniques.

In order to retain the low PAPR or CM property of IFDMA/DFT-SOFDM, only a single IFDMA code could be transmitted by each user which leads to a time division multiplexing (TDM) of pilot or reference symbol blocks, where data and pilot signals of a particular user are not mixed within the same symbol block. This allows the low PAPR property to be preserved and also enables the pilot to remain orthogonal from the data in multi-path channels, since there is conventionally a cyclic prefix between blocks.

Figure 2:
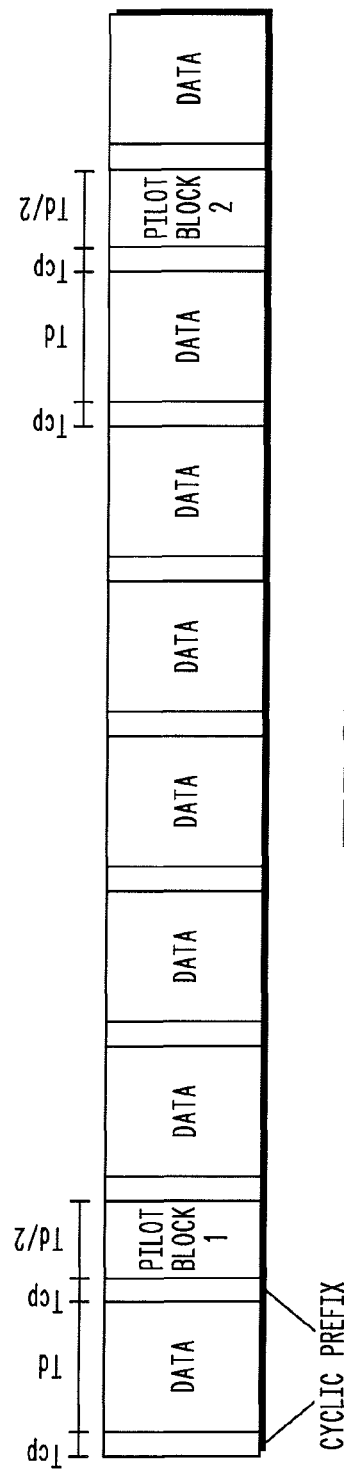
FIG. 2 illustrates an IFDMA/DFT-SOFDM pilot block and subsequent IFDMA/DFT-SOFDM data blocks for a transmission frame.

FIG. 2 illustrates an IFDMA/DFT-SOFDM pilot block and subsequent IFDMA/DFT-SOFDM data blocks for a transmission frame or burst. Multiplexing of pilot or reference signals and lower-layer control signaling may be based on time, frequency and/or code multiplexing. TDM reference signals may have a different, such as shorter, block duration than data blocks resulting in a sub-carrier bandwidth and occupied sub-carrier spacing for the pilot block that is greater than the sub-carrier bandwidth and the occupied sub-carrier spacing for the data block. In this case, if the pilot block length (excluding cyclic prefix) is $T_p$ and the data block length (excluding cyclic prefix) is $T_d$, the sub-carrier bandwidth and the occupied sub-carrier spacing for the pilot block is $T_d/T_p$ times the sub-carrier bandwidth and the occupied sub-carrier spacing for the data block, respectively. The pilot (or reference symbol) multiplexing shown in FIG. 2 is an example. Other possible configurations may have pilot and data blocks with the same data block length $T_d$, or may have no cyclic prefix present ($T_{cp}=0$), or may have different values for $T_{cp}$ on different symbols. Also, the number and location of pilot blocks in a transmission frame or burst may be different.

Figure 3:
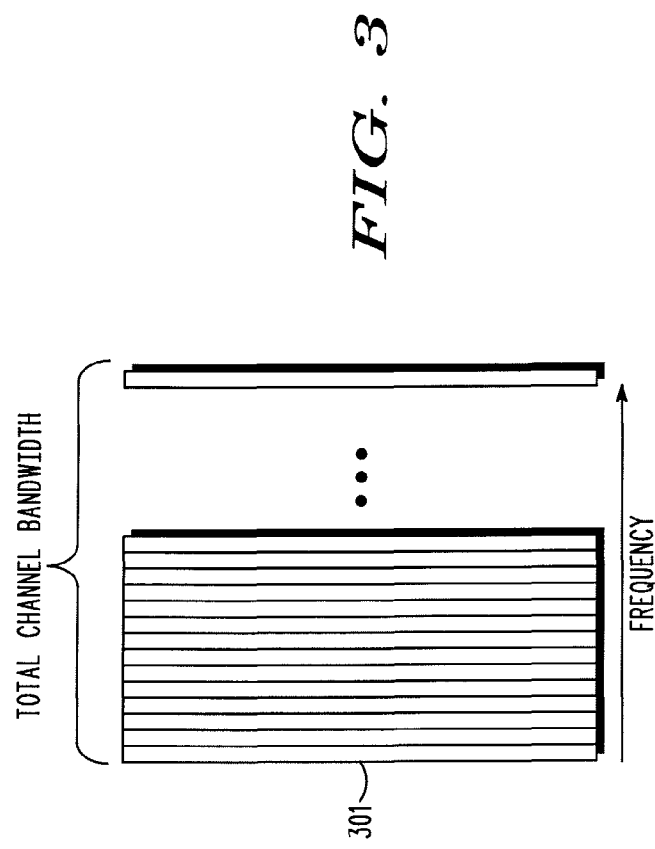
FIG. 3 illustrates a wideband channel divided into many narrow frequency bands.

As one of ordinary skill in the art will recognize, even though IFDMA and DFT-SOFDM can be seen as single-carrier-based schemes, during operation of an IFDMA system or a DFT-SOFDM system, multiple sub-carriers, e.g., 768 sub-carriers, are utilized to transmit data. This is illustrated in FIG. 3. In FIG. 3, a wideband channel is divided into many narrow frequency bands (sub-carriers) 301, with data being transmitted in parallel on the sub-carriers. However, a difference between OFDMA and IFDMA/DFT-SOFDM is that in OFDMA each data symbol is mapped to a particular sub-carrier, whilst in IFDMA/DFT-SOFDM a portion of each data symbol is present on every occupied sub-carrier (the set of occupied sub-carriers for a particular transmission may be either a subset or all of the sub-carriers). Hence in IFDMA/DFT-SOFDM, each occupied sub-carrier contains a mixture of multiple data symbols.

Returning to FIG. 1, the communication system includes one or more base units 101 and 102 and one or more remote units 103 and 110. A base unit comprises one or more transmitters and one or more receivers that serve a number of remote units within a sector. The number of transmitters may be related, for example, to the number of transmit antennas at the base unit. The base units 101 and 102 communicate with remote units 103 and 110 to perform functions such as scheduling the remote units to receive or transmit data using available radio resources. A base unit may also be referred to as an access point, access terminal, Node-B, or similar terminologies from the art. A remote unit comprises one or more transmitters and one or more receivers. The number of transmitters may be related, for example, to the number of transmit antennas at the remote unit. A remote unit may also be referred to as a subscriber unit, a mobile unit, a mobile terminal, a user, a terminal, a wireless communication terminal, a subscriber station, user equipment (UE), a user terminal or similar terminologies from the art. As known in the art, the entire physical area served by the communication network may be divided into cells, and each cell may comprise one or more sectors. The network also comprises management functionality including data routing, admission control, subscriber billing, terminal authentication, etc., which may be controlled by other network entities, as is known generally by those having ordinary skill in the art.

When multiple antennas are used to serve each sector to provide various advanced communication modes (e.g., adaptive beam-forming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time and/or frequency). Remote units 103 and 110 communicate with one or more base units 101 and 102 via uplink communication signals 106 and 113.

In FIG. 1, while only two base units and two remote units are shown, one of ordinary skill in the art will recognize that typical communication systems comprise many base units in simultaneous communication with many remote units. A base unit or a remote unit may be referred to more generally as a communication unit.

Generally, a wireless communication network infrastructure scheduling entity located, for example, in a base station 101, 102, allocates or assigns radio resources to wireless communication entities, e.g., mobile terminals, in the wireless communication network. In FIG. 1, the base stations 101, 102 each include a scheduler (not shown) for scheduling and allocating resources to mobile terminals in corresponding cellular areas. In multiple access schemes such as those based on OFDM methods, multi-carrier access or multi-channel CDMA wireless communication protocols including, for example, IEEE-802.16Rev2, multi-carrier HRPD-A in 3GPP2, and the long term evolution of UTRA/UTRAN Study Item in 3GPP (also known as evolved UTRA/UTRAN (EUTRA/EUTRAN)), scheduling may be performed in the time and frequency dimensions using a Frequency Selective (FS) scheduler. To enable FS scheduling by the base station scheduler, in some embodiments, each mobile terminal provides a per-frequency band channel quality indicator (CQI) or a channel sounding to the scheduler.

In OFDM systems or OFDM like systems such as DFT-SOFDM and IFDMA, a resource allocation is the frequency and time allocation that maps information for a particular UE to sub-carrier resources from a set of available sub-carriers, wherein the available sub-carriers may include a DC sub-carrier, as determined by the scheduler. The DC sub-carrier is defined to be the sub-carrier that is within a sub-carrier separation distance of the radio frequency carrier frequency. In some embodiments, the DC sub-carrier would be substantially within a half sub-carrier separation distance of the radio frequency (RF) carrier frequency. A sub-carrier separation distance is the distance between two consecutive sub-carriers. For uniformly separated sub-carriers the sub-carrier separation distance would be the same for each pair of consecutive sub-carriers.

In the case where DC distortion, which occurs at the carrier frequency at RF, does not align exactly with the transmitted sub-carriers then the term "DC sub-carrier" refers to DC distortion at the carrier frequency at RF, rather than a sub-carrier that could potentially be used for transmission. In one embodiment, the "radio frequency carrier frequency" is defined with respect to the wireless communications device transmitter. In another embodiment, for the purpose of DC sub-carrier definition, the radio carrier frequency can be either the radio carrier frequency of a transmitting device or a receiving device. Normally, if the transmitting device and receiving device are operating with the same bandwidth on the same communication channel, the radio carrier frequency of the transmitter and receiver will be substantially the same. However, if the transmitter and receiver are operating with differing bandwidths, the receiver will have a receiver-associated DC sub-carrier associated with its radio carrier frequency, and optionally may be considered to have an additional transmitter-associated DC sub-carrier associated with the radio carrier frequency of the transmitter.

The resource allocation may depend, for example, on the frequency-selective channel sounding or channel-quality indication (CQI) reported by the UE to the scheduler. The channel-coding rate and the modulation scheme, which may be different for different portions of the sub-carrier resources, are also determined by the scheduler and may also depend on the channel sounding or reported CQI. In some applications, the UE may not be assigned consecutive sub-carriers. For example, it could be assigned every Qth sub-carrier (equally spaced, non-consecutive) of the entire portion or a portion of the available system sub-carriers to improve frequency diversity. The available system sub-carriers not including the DC sub-carrier may be grouped into one or more resource blocks (RB) wherein each resource block comprises the same (common) number of sub-carriers. A resource assignment to a UE can be a resource block or a fraction thereof. More generally, a resource assignment or allocation is a fraction of multiple resource blocks.

Figure 4A:
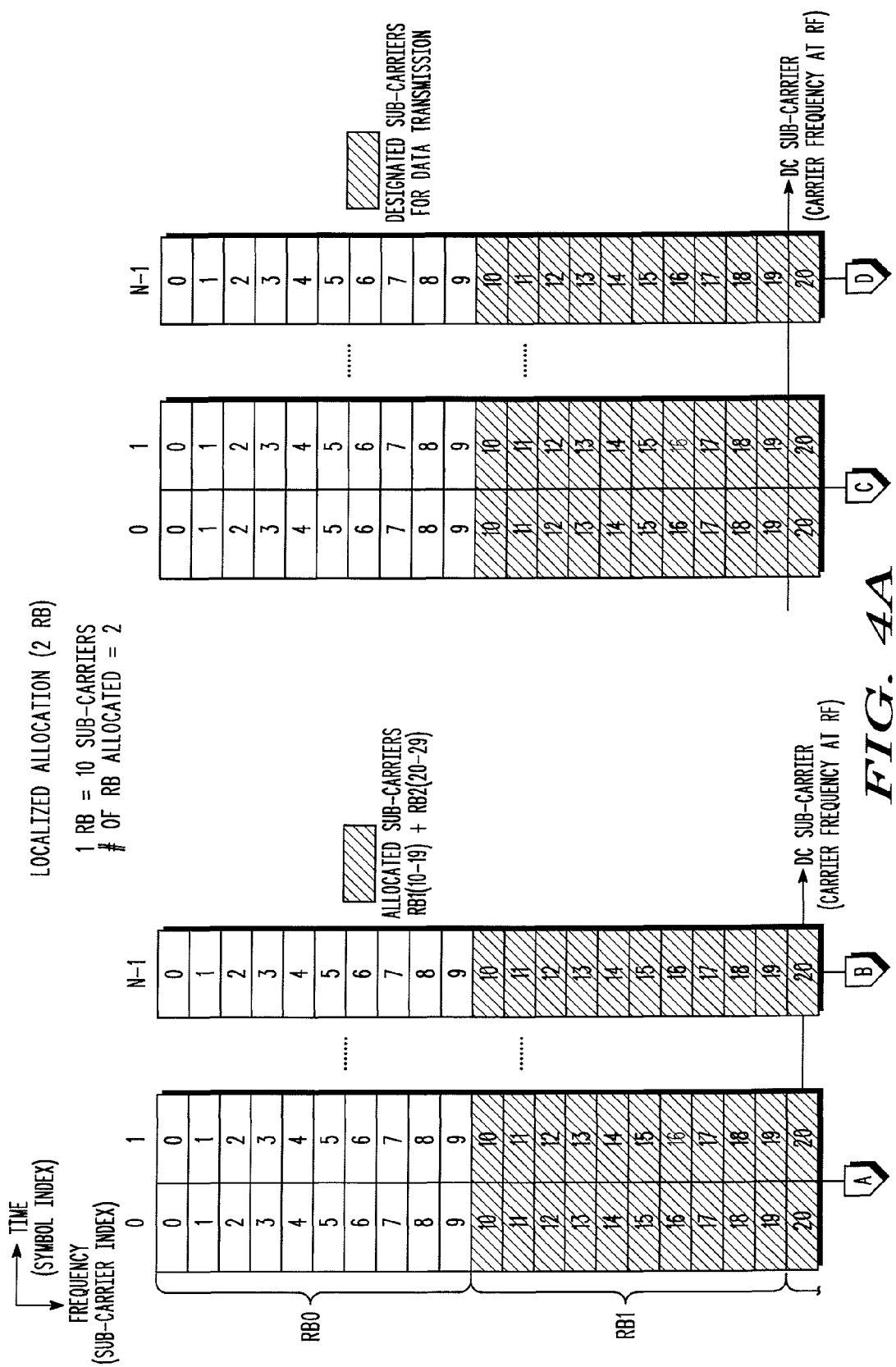
FIG. 4 illustrates multiple resource blocks including a DC sub-carrier within an allocated resource block.
Figure 4B:
Figure 4B:
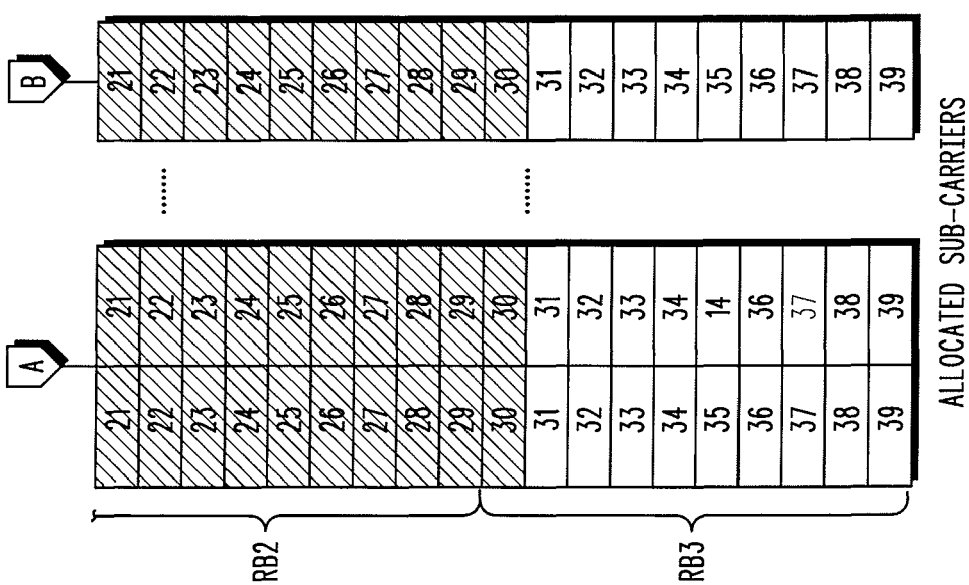

During transmission, information is preferably modulated on one or more of the designated sub-carriers using DFT-SOFDM or some other modulation scheme. The information may consist of data, control, pilot signals, access signals, etc., or various combinations thereof. In FIG. 4, the sub-carriers of the resource allocation are consecutive resulting in a so called "localized allocation" and the information is transmitted on consecutive sub-carriers of the one or more designated sub-carriers. More particularly, a UE is allocated a localized allocation comprising two consecutive resource blocks, RB1 (sub-carrier indexes 10-19) and RB2 (indices 20-29) with one resource block (RB) comprising 10 sub-carriers.

In the above examples, uplink sounding (for channel dependent scheduling) can take into account that allocations are preferably not done so as to span DC, such as by sounding at least a portion of the bandwidth on either side of the DC sub-carrier. At the receiver, since allocations that do not span DC may perform better, restrictions on the scheduler may also help mitigate any possible degradation from DC sub-carrier distortion due to local oscillator leakage.

In another embodiment, shown in FIG. 4, the DC sub-carrier is included as one of the sub-carriers of the resource block RB2 and a UE is allocated a localized allocation comprising RB1 and RB2 for transmission. In this embodiment, the transmitted signal is frequency shifted by a fraction of the sub-carrier spacing, for example, ½ the sub-carrier spacing, prior to transmission resulting in no data modulated exactly on the DC sub-carrier (carrier frequency at RF). That is, the carrier frequency of the wireless communication device does not coincide with the nominal center frequency of a sub-carrier of the allocated resource blocks. Thus, the impact of the DC distortion due to local oscillator leakage is distributed over sub-carriers adjacent to the DC sub-carrier instead of being concentrated on the DC sub-carrier without any frequency shift. In FIG. 4, the allocated sub-carriers corresponding to RB1 and RB2 are frequency shifted by ½ the sub-carrier spacing. For a transmission frame or burst format including different block lengths, e.g., half-length short blocks (SB) multiplexed with full-length long blocks (LB) having different sub-carrier spacings, the frequency shift may be different for SB and LB. In other embodiments, it may be desirable to keep the absolute frequency shift constant (in Hz) and select different fraction values on the SB and LB, for example, ½ sub-carrier spacing on LB and ¼ sub-carrier spacing on SB.

The time-continuous transmit signal $s_l(t)$ with ½ sub-carrier spacing frequency shift in DFT-SOFDM/SC-FDMA block/symbol l in a burst or slot is given by $$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l} \cdot e^{j2\pi(k+1/2)\Delta f(t-N_{CP,l}T_s)}$$

for $0 \leq t < (N_{CP,l}+N) \times T_s$ where $T_s$ is sampling time, $N_{CP,l}$ is the number of samples for the cyclic prefix in SC-FDMA symbol l, $N_{RB}^{UL}$ is the number of resource blocks in the system bandwidth, $N_{sc}^{RB}$ is the number of sub-carriers per resource block, $k^{(-)} = k + \lfloor N_{RB}^{UL} N_{sc}^{RB}/2 \rfloor$, $\Delta f$ is the sub-carrier spacing (for example, $\Delta f = 15$ kHz), and $a_{k,l}$ is the content of sub-carrier or resource element k on block l after DFT-spreading. $a_{k,l}$ is only non-zero on the designated sub-carriers corresponding to the resource allocation. The SC-FDMA blocks or symbols in a slot are transmitted in increasing order of l, starting with l=0, where SC-FDMA symbol l>0 starts at time $$\sum_{l'=0}^{l-1} (N_{CP,l'} + N) T_s$$

within the slot. The time-continuous transmit signal $s_l(t)$ without any frequency shift in SC-FDMA symbol l in an uplink slot is given by $$s_l(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k^{(-)},l} \cdot e^{j2\pi k \Delta f(t-N_{CP,l}T_s)}$$

for $0 \leq t < (N_{CP,l}+N) \times T_s$.

As discussed, direct conversion transmitters and receivers introduce significant distortion on the DC sub-carrier (or RF carrier frequency). On the uplink, the distortion includes unsuppressed carrier feedthrough from all the active transmitters in the uplink. Simply discarding (zeroing out) the DC sub-carrier at the receiver can cause 0.9 dB of degradation for 1 resource block (12 sub-carrier) allocations with 16QAM modulation. On the other hand, no removal of the DC distortion at the receiver results in significant degradation for high DC distortion values. Therefore, there is a need for improved DC sub-carrier handling in the receiver of DFT-SOFDM uplink.

In order to address this need, receiving units will switch between performing the DC bias suppression and not removing the DC distortion at the receiver depending on the amount of DC interference level observed/measured/estimated. Since the overall DC interference is from all uplink transmitters, potentially at different power levels, the amount of DC distortion can be measured based on the difference between the received power level and the expected power level on the DC sub-carrier. Additionally it can be estimated based on the number of active transmitters, their allocation bandwidth, power control target and/or a rough estimate of the DC distortion introduced by each active transmitter and also the distortion introduced by the receiver. Once this distortion level is estimated, a decision is then made whether or not to remove the DC distortion.

In one embodiment, the DC distortion can be suppressed at the receiver by discarding the received frequency domain signal on at least one sub-carrier within a sub-carrier distance of the DC distortion after frequency domain transformation of the received baseband signal. This is referred to as frequency-domain DC suppression. In another embodiment, the DC distortion is estimated, for example in the time domain by averaging at least a portion of the received baseband signal, and then, the obtained DC distortion estimate is subtracted from the received baseband signal in the time domain. If the transmitted signal is frequency shifted by a fraction of the sub-carrier spacing, frequency translation of the received baseband signal can be performed before frequency domain transformation, and the time domain DC distortion suppression is applied before frequency translation of the received signal.

Figure 5:
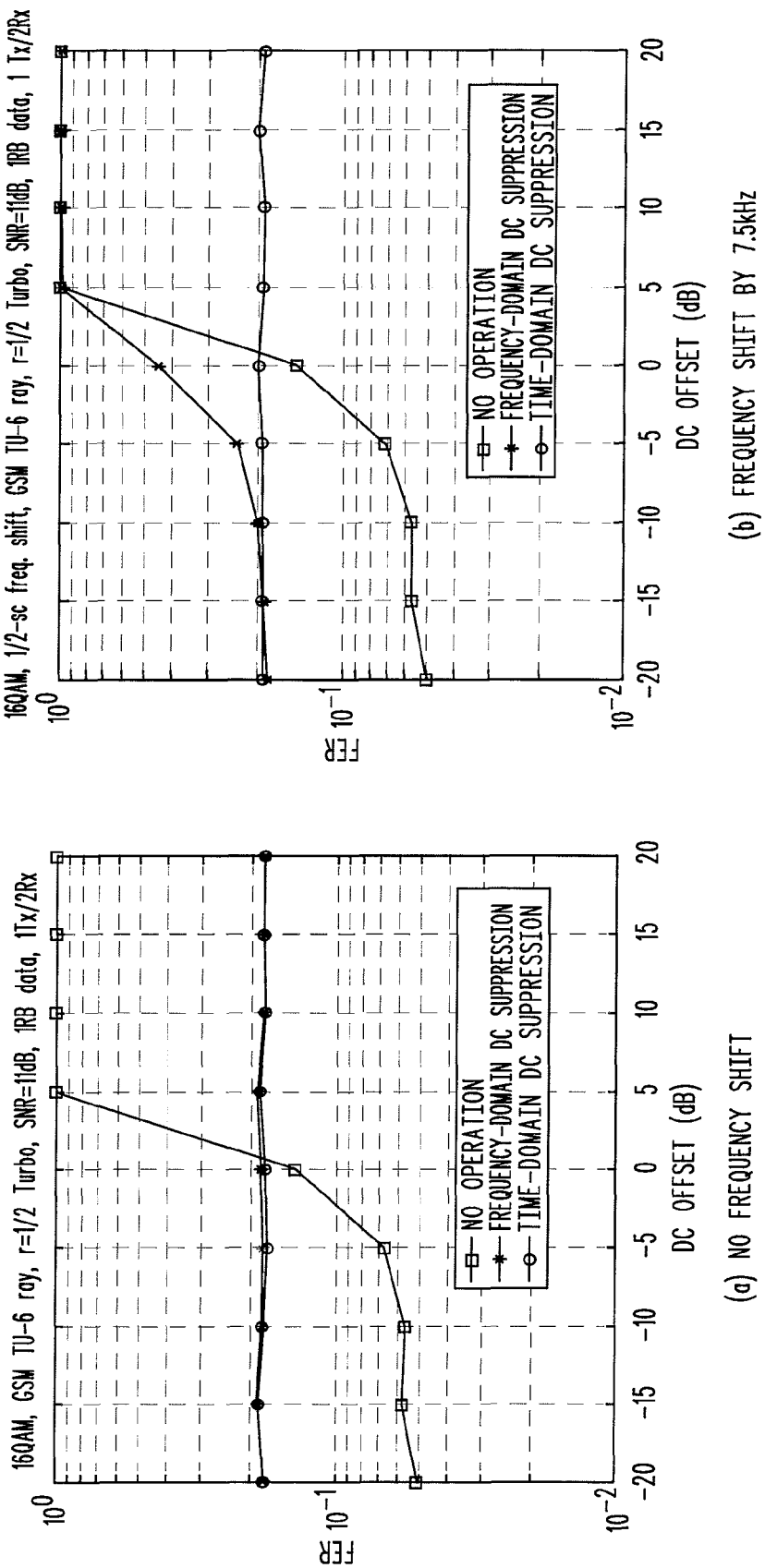
FIG. 5 demonstrates the benefit of adaptively switching between performing the DC bias suppression and not removing any DC distortion at the receiver for detection.
Figure 6:
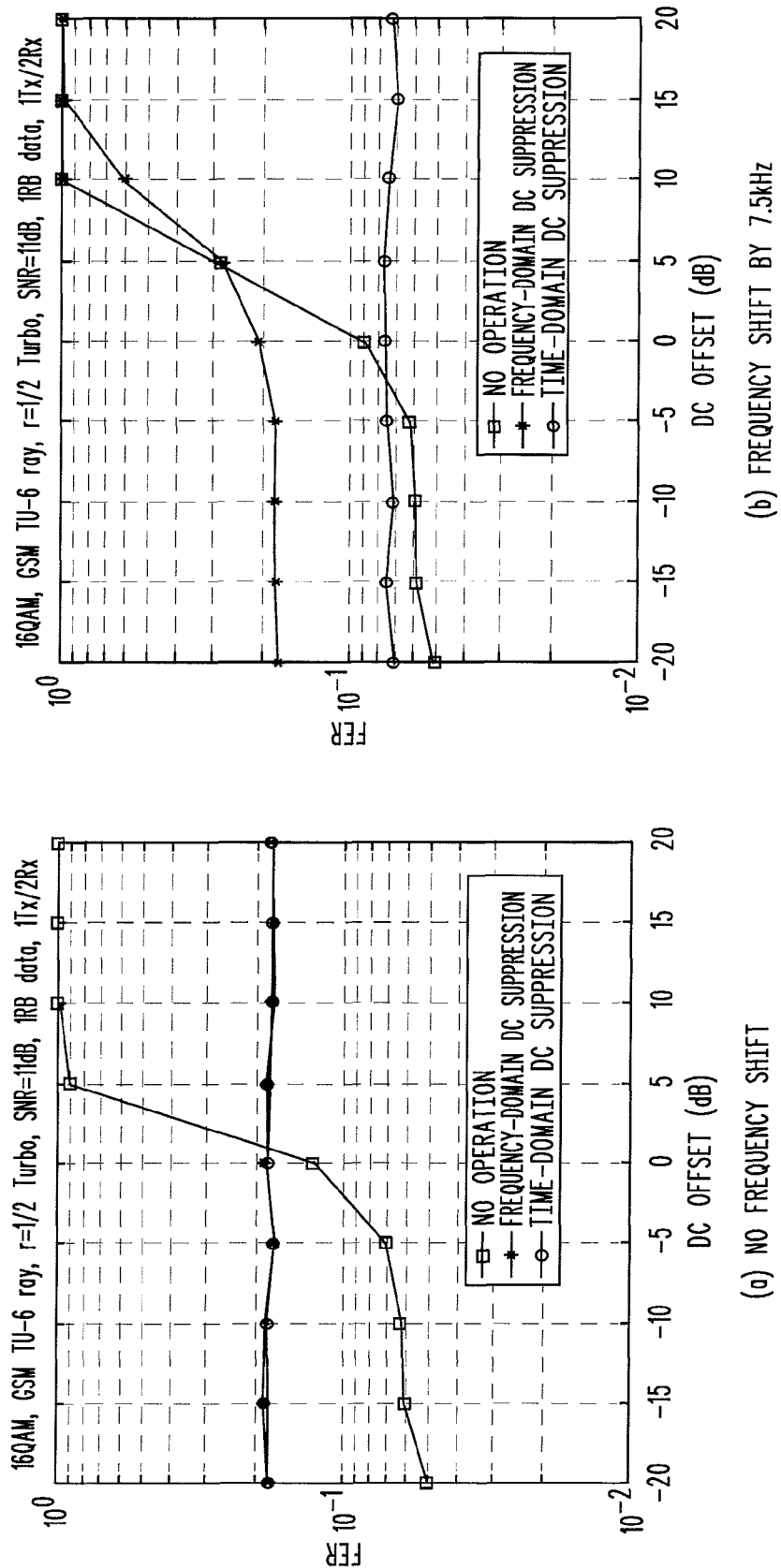
FIG. 6 demonstrates the benefit of adaptively switching between performing the DC bias suppression and not removing any DC distortion at the receiver for detection.

FIG. 5 and FIG. 6 demonstrate the benefit of adaptively switching between performing the DC bias suppression and not removing any DC distortion at the receiver for detection. Simulation parameters in Table 1 are assumed (similar to current accepted 3GPP parameters) for size of 1 RB allocations (RB=12 sub-carriers).

TABLE I

System Parameters.

| Item | Value/Description |
| --- | --- |
| Channel Bandwidth | 5 MHz |
| Number of sub-carriers in 1 RB | 12 |
| Sub-carrier spacing | 15 kHz |
| Cyclic prefix length | 4.04 µs |
| Baud/Symbol duration | 66.67 µs |
| FFT size | 512 |
| Modulation | QPSK, 16-QAM |
| Coding | Rate-½, Turbo (rate-⅓ 8-state constituent convolutional) Max-log-MAP kernel, 3GPP interleaver, 8 iterations |
| Channel | GSM TU-6, Quasi-static |
| Number of Tx Antennas | 1 |
| Number of Rx Antennas | 2 |

Performance is evaluated for the following configurations with and without suppressing the DC distortion:
 1 RB allocation with DC sub-carrier on the center and no frequency shift;
 1 RB allocation with DC sub-carrier at the edge and no frequency shift;
 1 RB allocation with DC sub-carrier near the center and 7.5 kHz frequency shift to the UL signal—½ sub-carrier frequency shift (no sub-carrier is centered at DC); and
 1 RB allocation with DC sub-carrier near the edge and the UL signal frequency shifted by 7.5 kHz frequency.

FIG. 5 compares the performance with and without suppressing the DC distortion at the receiver for different DC distortion levels when the DC distortion is located on the center or near the center of allocation. FIG. 5 (*a*) shows the performance without frequency shift of the UL signal while FIG. 5 (*b*) shows the performance with 7.5 kHz frequency shift.

It can be seen from FIG. 5 that there is a cross-over point for when not suppressing the DC sub-carrier performs better than performing suppression and vice-versa (for both no frequency shift and frequency shift cases). For DC distortion below ~0.5 dB for no frequency shift, no suppression is desirable in the receiver, while for DC distortion above this value DC distortion removal is more desirable than not suppressing the DC distortion. As shown in FIG. 5 (*a*), frequency-domain DC suppression is equivalent to time-domain DC suppression for the case of no frequency shift. FIG. 5 (*b*) shows that time-domain DC suppression is more appropriate for the case of frequency shift.

FIG. 6 compares the performance with and without removing the DC distortion at the receiver for different DC distortion levels when the DC distortion is located at the edge or near the edge sub-carrier. FIG. 6 (*a*) shows the performance without frequency shift of the UL signal while FIG. 6 (*b*) shows the performance with 7.5 kHz frequency shift.

Similar to the trend in FIG. 5, it can be seen from FIG. 6 (*a*) that for DC distortion below ~0.5 dB with no frequency shift, no operation done for removing the DC distortion is desirable in the receiver, while for DC distortion higher than ~0.5 dB, DC suppression is more desirable than not suppressing the DC distortion. FIG. 6 (*b*) also shows cross-over points (~−2 dB for time-domain DC suppression and ~5 dB for frequency-domain DC suppression) for when not suppressing the DC sub-carrier performs better than performing suppression and vice-versa with frequency shift.

Thus, it is desirable for best performance to adaptively switch between suppressing and not suppressing the DC distortion. The DC distortion suppression is done either by discarding the sub-carrier(s) closest to DC (i.e., RF carrier frequency) in the receiver or by subtracting the estimated DC distortion from the time domain received signal depending on the amount of DC distortion level observed.

Figure 7A:
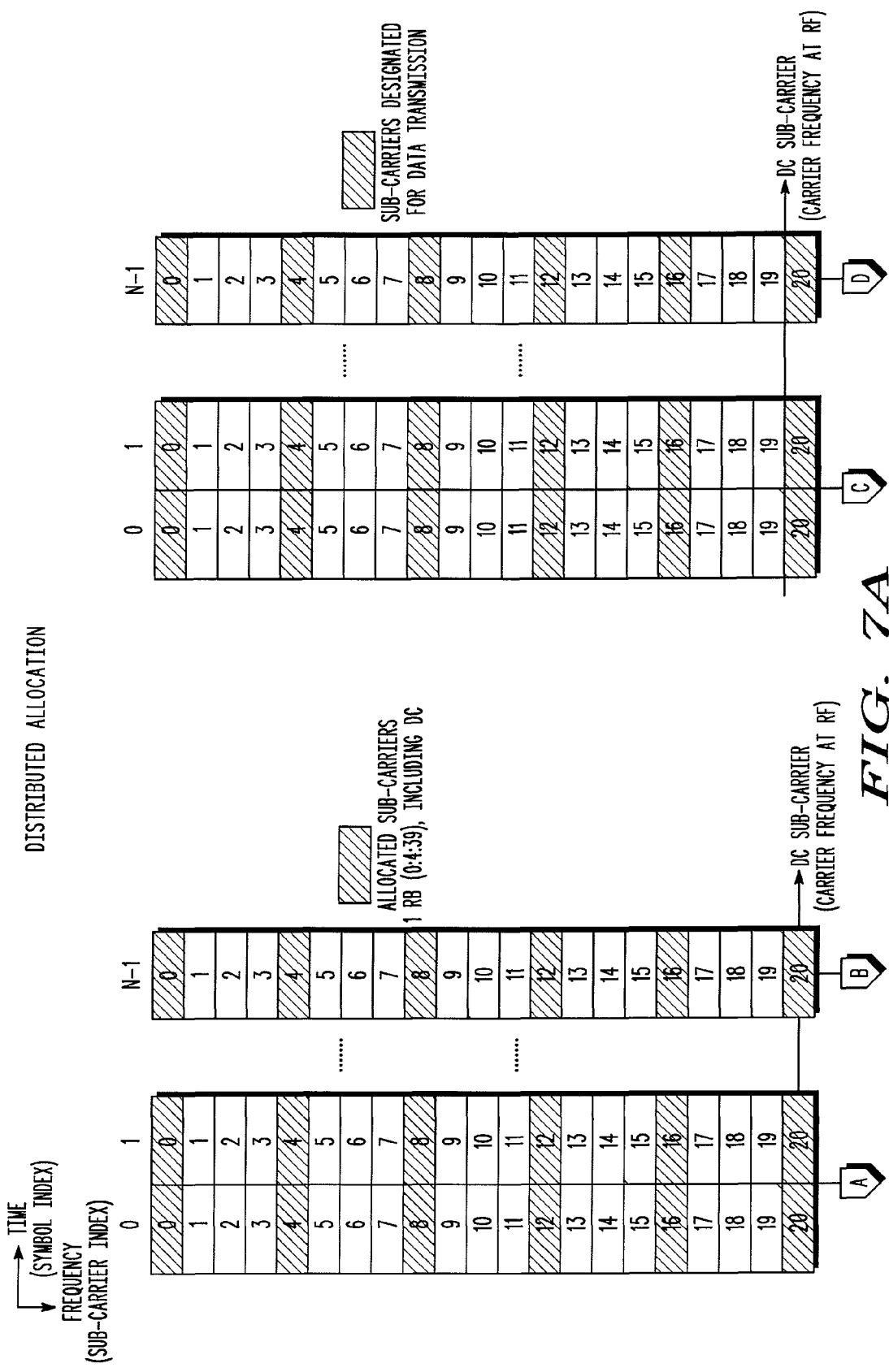
FIG. 7 illustrates a distributed sub-carrier allocation.
Figure 7B:
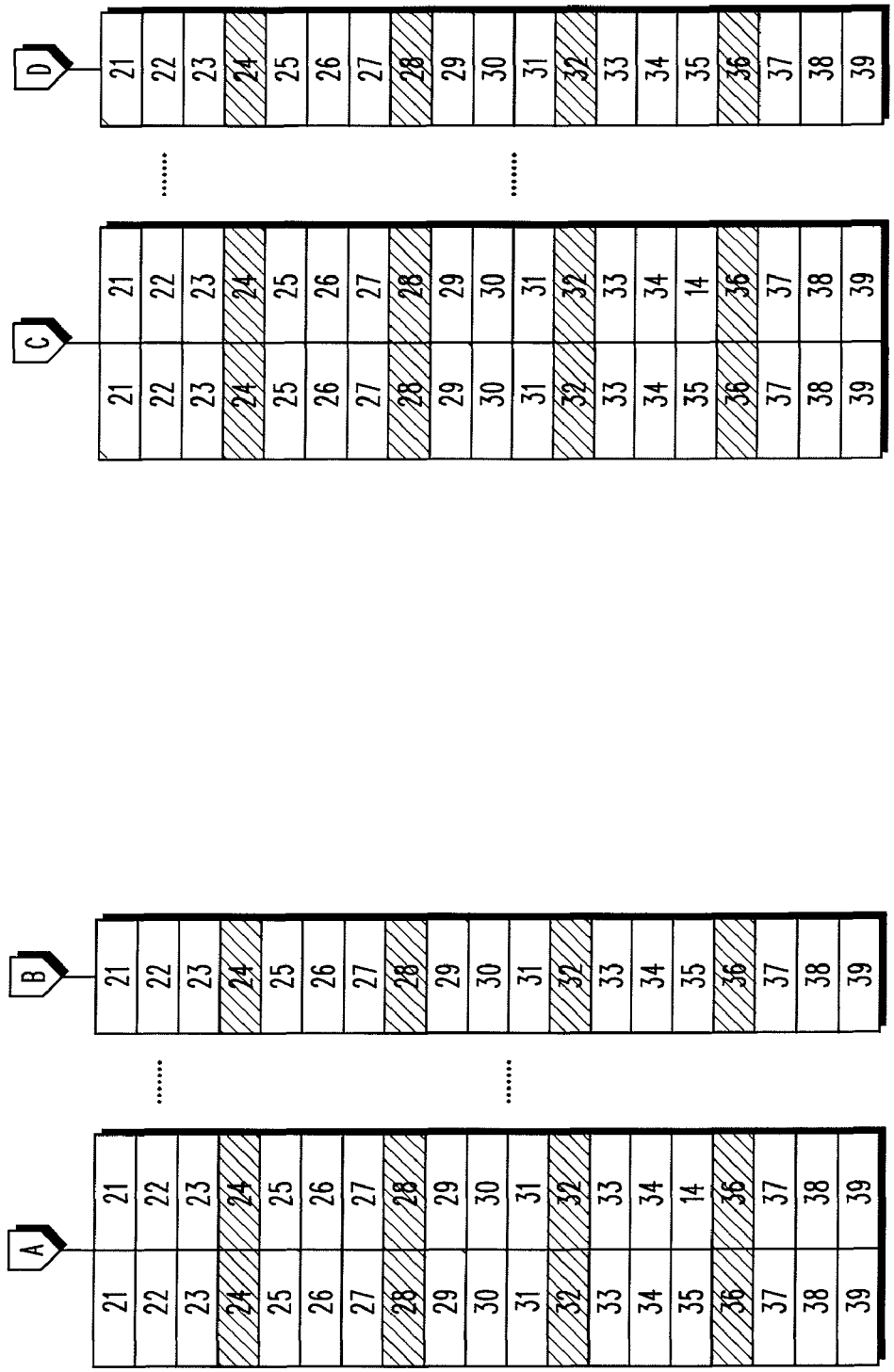

If the transmitter and receiver are operating with differing bandwidths, the receiver will have a receiver-associated DC sub-carrier associated with its radio carrier frequency, and optionally may be considered to have an additional transmitter-associated DC sub-carrier associated with the radio carrier frequency of the transmitter. Thus, multiple DC distortion locations induced by all active transmitters and the receiver may occur in the uplink. In one embodiment, both time-domain DC bias removal and discarding one or more sub-carrier(s) closest to DC in the frequency domain may be performed jointly to suppress multiple DC distortions. In an alternative embodiment, either time-domain DC suppression or frequency-domain DC suppression may be performed to suppress multiple DC distortions. The time-domain DC bias estimation and/or removal may be performed individually for the different DC distortion location. For example, the received signal can be frequency translated such that a DC distortion location corresponds to the receiver-associated DC sub-carrier location and an estimate of DC distortion can be obtained in the time domain by averaging at least a portion of the frequency translated received baseband signal. The DC distortion estimate is then subtracted from the frequency translated received baseband signal in the time domain before undoing the frequency translation or frequency translating to another DC distortion location. Since the distortion level may not be the same for each DC distortion location, adaptive switching between performing the DC suppression and not suppressing the DC distortion may be dependent on the DC distortion location. In another embodiment, in FIG. 7, a UE is allocated a distributed allocation. One way to specify the distributed sub-carriers assigned is to specify the sub-carrier offset index S, the repetition factor R (or the sub-carrier decimation factor or skip factor), and the index of the last sub-carrier allocated, B. The parameters are similar to a B-sub-carrier OFDM modulator, with sub-carrier mapping of evenly-spaced sub-carriers with spacing of R sub-carriers with a sub-carrier offset of S for an DFT-SOFDM signal. These can be written as an ordered triplet: (S, R, B), and the distributed allocation shown in FIG. 7 can be denoted by (0, 4, 36). In this embodiment, the distributed signal is frequency shifted by a fraction, e.g., ½, of a sub-carrier spacing prior to transmission resulting in no data modulated exactly on the DC sub-carrier (carrier frequency at RF).

In another embodiment, the radio resource is allocated based on a condition of the wireless communication terminal or the radio resource allocation satisfies a minimum size requirement if the radio resource allocation includes a sub-carrier within a sub-carrier distance of the radio frequency carrier frequency. In a more specific embodiment, the condition is satisfied when the radio resource allocation includes a sub-carrier within ½ the sub-carrier distance of the radio frequency carrier frequency called the DC sub-carrier. For an allocation that spans the DC sub-carrier, since the allocation includes the DC sub-carrier then the DC distortion due to local oscillator leakage is expected to degrade the performance of the allocation. There are at least two scheduling techniques that may limit this degradation. The first is to advantageously select the UE that includes the DC sub-carrier in order to overcome degradation due to DC distortion. Such a selection may be based on allocating the resource allocation to one of a plurality of wireless communication terminals on the condition that it is not power limited. For example, a group of resource blocks including DC may be allocated when a maximum power level of the UE is higher than a power controlled power level of the UE. The selection may also be based on the condition on whether the UE has significant DC suppression in its transmitter, where a group of resource blocks including DC may be allocated to the UE with significant DC suppression in its transmitter. The UE capability or class with such suppression capability may be previously signaled to the serving communication network, such as whether or not the terminal has significant DC suppression in its transmitter.

A second scheduling technique is to impose limits on the minimum size of an allocation that may limit degradation when the allocation includes the DC sub-carrier. If allocations are made in terms of numbers of resource blocks, the minimum size of a group of resource blocks allocated may be determined by whether the group includes the DC resource block and the location of the DC sub-carrier within the group. In one embodiment, the minimum number of resource blocks in a group containing the DC resource block may be chosen to be larger than a threshold N1 when the DC sub-carrier is adjacent to more than one of the plurality of sub-carriers and N2 when the DC sub-carrier is adjacent to not more than one of the plurality of sub-carriers. N2 may be conditioned on whether a maximum power level of the schedulable wireless communication terminal resulting from the allocation is higher than a power controlled power level of the schedulable wireless communication terminal. N1 or N2 may also be conditioned on resource block size (e.g., 12 sub-carriers, 15 sub-carriers, or 25 sub-carriers).

Figure 8:
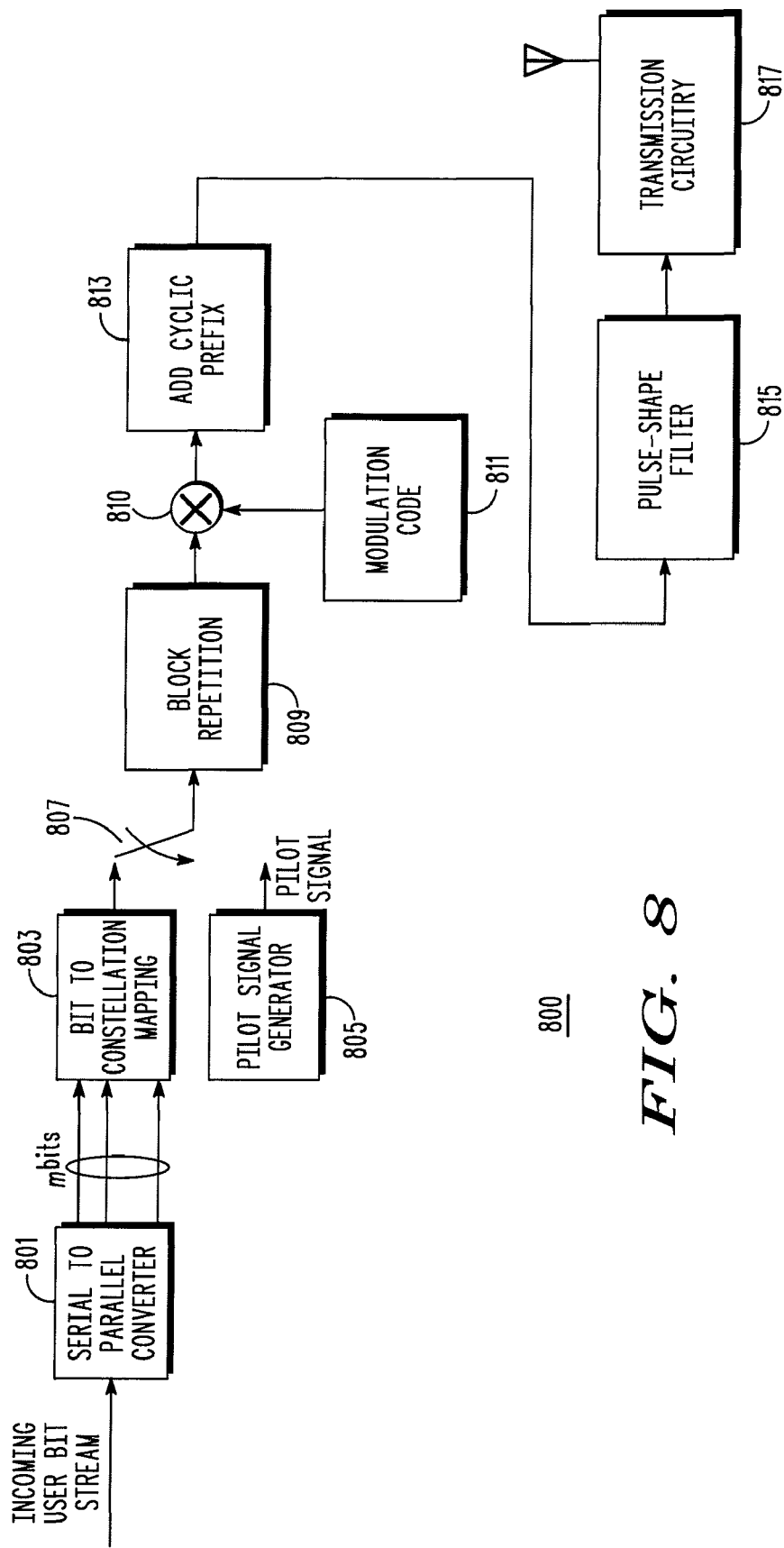
FIG. 8 is a block diagram of an IFDMA transmitter.

FIG. 8 is a block diagram of an IFDMA transmitter 800 capable of performing time-domain signal generation. In operation, incoming data bits are received by serial to parallel converter 801 and output as m-bit streams to constellation mapping circuitry 803. Switch 807 receives either a pilot signal (sub-block) from pilot signal generator 805 or a data signal (sub-block) from mapping circuitry 803 of sub-block length, Bs. The length of the pilot sub-block may be smaller or larger than that of the data sub-block. Regardless of whether a pilot sub-block or data sub-block are received by sub-block repetition circuitry 809, circuitry 809 performs sub-block repetition with repetition factor $R_d$ on the sub-block passed from switch 807 to form a data block of block length B. Data block and a modulation code 811 are fed to a modulator 810. Thus, the modulator 810 receives a symbol stream (i.e., elements of a data block) and an IFDMA modulation code (sometimes referred to as simply a modulation code). The output of modulator 810 comprises a signal existing at certain evenly-spaced frequencies, or sub-carriers, wherein the sub-carriers having a specific bandwidth.

The actual sub-carriers utilized are dependent on the repetition factor $R_d$ of the sub-blocks and the particular modulation code utilized. The sub-block length $B_s$, repetition factor $R_d$, and modulation code can also be changed over time. Changing the modulation code changes the set of sub-carriers, so changing the modulation code is equivalent to changing $S_d$. Varying the block length B varies the specific bandwidth of each sub-carrier, with larger block lengths having smaller sub-carrier bandwidths. While changing the modulation code will change the sub-carriers utilized for transmission, the evenly-spaced nature of the sub-carriers remain. Thus, a sub-carrier changing pilot pattern is achieved by changing the modulation code. In one embodiment, the modulation code is changed at least once per burst. In another embodiment, the modulation code is not changed in a burst. A cyclic prefix is added by circuitry 813 and pulse-shaping takes place via pulse-shaping circuitry 815. The resulting signal is transmitted via transmission circuitry 817.

Figure 9:
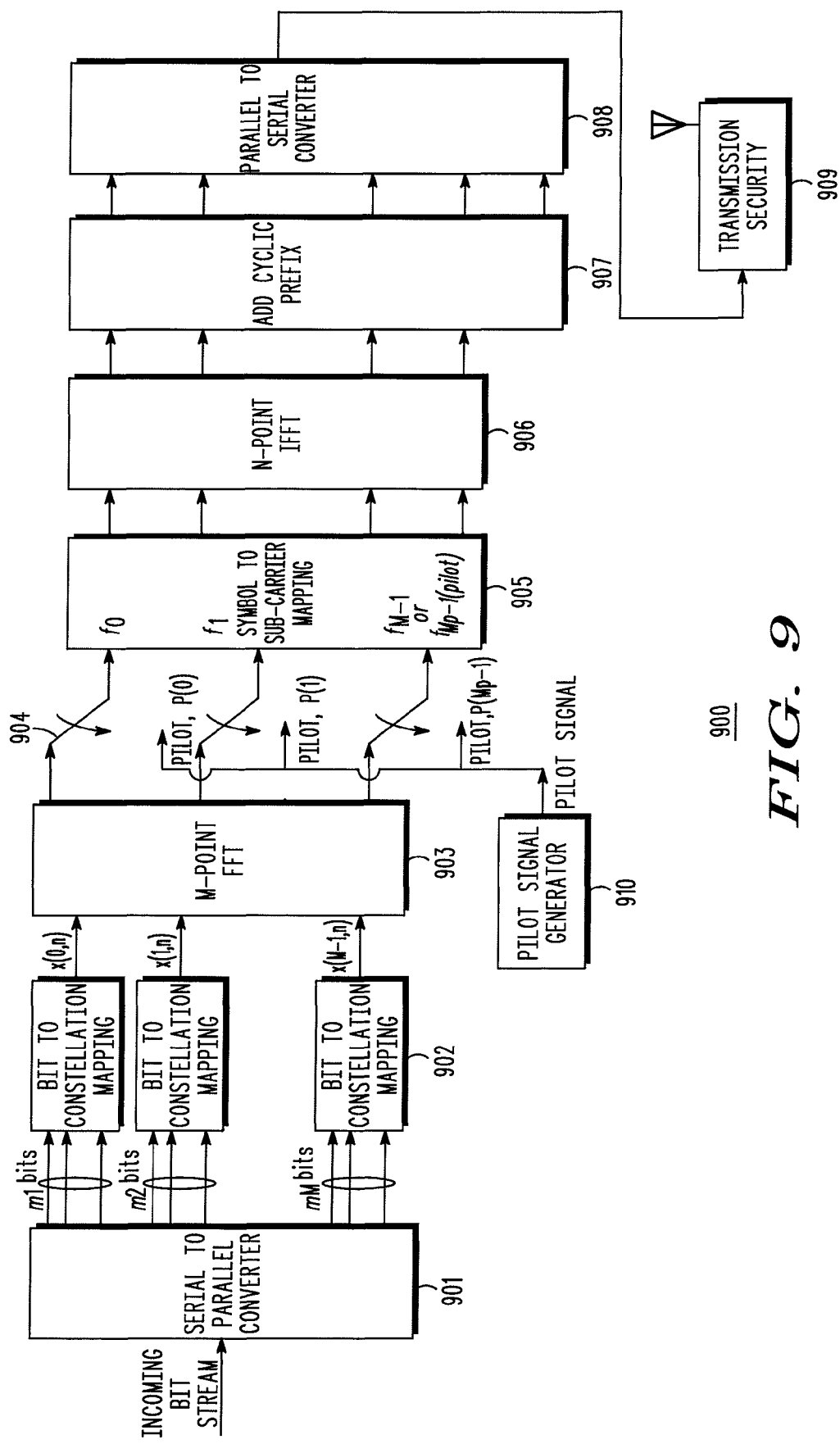
FIG. 9 is a block diagram of a DFT-SOFDM transmitter.

FIG. 9 is a block diagram of DFT-SOFDM transmitter 900 used to transmit pilots and data in the frequency. Blocks 901, 902 and 906-909 are similar to a conventional OFDM/OFDMA transmitter, while blocks 903 and 905 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero, thus providing an oversampling function to simplify the implementation of the subsequent transmission circuitry, as is known in the art. As described earlier, different sub-carrier bandwidths may be used on pilot blocks than on data blocks, corresponding to different pilot block and data block lengths. In the transmitter of FIG. 9, different sub-carrier bandwidths can be provided by different IDFT sizes (N) for pilot blocks and data blocks. For example, a data block may have N=512 and the number of usable sub-carriers within the channel bandwidth may be B=384. Then, an example of a pilot block having a larger sub-carrier bandwidth (and more specifically, a sub-carrier bandwidth twice as large as a data block) is obtained by using N=512/2=256 for the pilot block, with the number of usable pilot sub-carriers being B=384/2=192. The specific set of sub-carriers out of those occupied by a data block or a pilot block are determined by the mapping block 905. In FIG. 9, an additional element is inserted in between 908 and 909 to perform a frequency shift by a fraction of the sub-carrier spacing. This shift can be equivalent to multiplication by $\exp(j2\pi\Delta ft)$, where $\Delta f$ is the desired shift.

Figure 10:
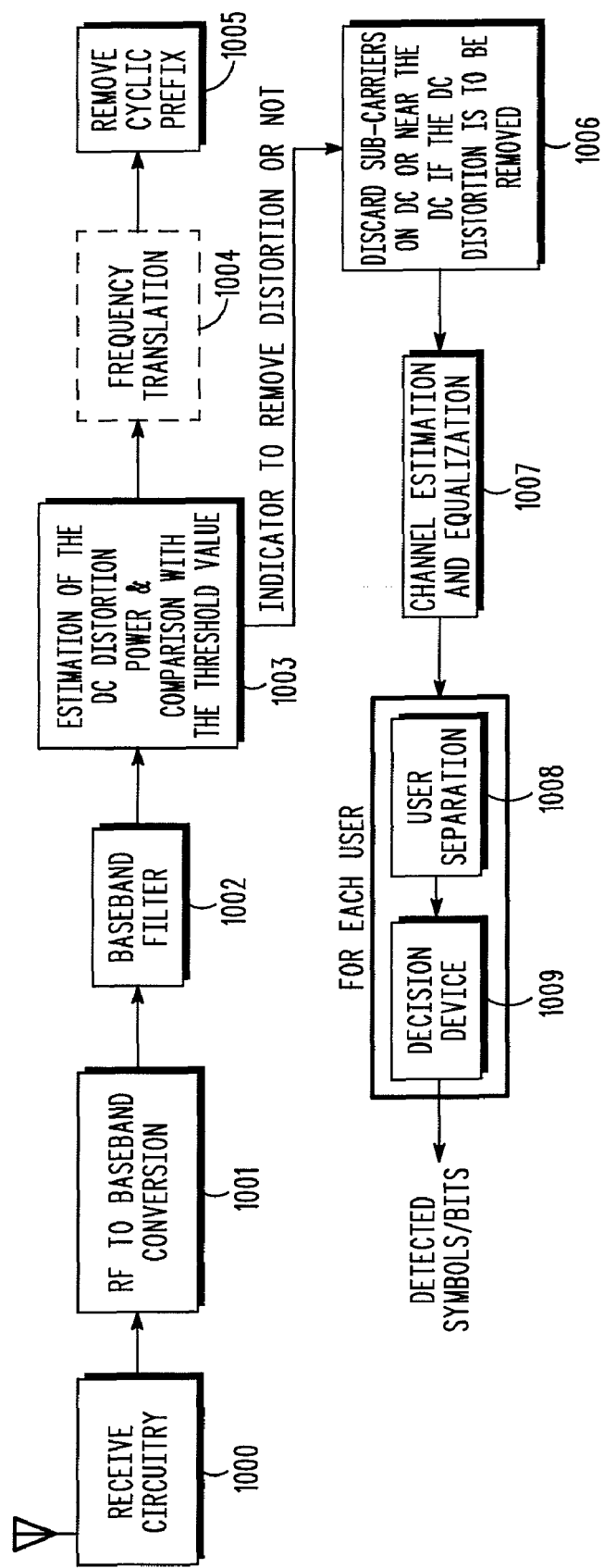
FIG. 10 is a block diagram of a receiver with frequency-domain DC suppression.

FIG. 10 is a receiver block diagram having frequency-domain DC suppression. Receive circuitry 1000 receives a composite of the channel distorted transmit signal from all the transmitters. During operation, the received signal is converted to baseband by baseband conversion circuitry 1001 and baseband filtered via filter 1002. Logic circuitry 1003 is provided to estimate the DC distortion power and compare with a threshold value. As discussed above, the distortion will be removed if the amount of DC distortion is above a threshold. Frequency translation takes place in frequency-translation circuitry 1004 if transmit signals from the mobile terminals is frequency shifted by a fraction of the sub-carrier spacing before transmission. This frequency translation at the receiver can be equivalent to multiplication by $\exp(-j2\pi\Delta ft)$, where $\Delta f$ is the desired shift, and is the inverse of the operation performed at the transmit side in the case. For the case when no frequency shift by a fraction of the sub-carrier is performed in the mobile terminals, frequency-translation circuitry 1004 is skipped. The cyclic prefix is removed from the pilot and data blocks via cyclic prefix removal circuitry 1005. The remaining data and pilot blocks are passed to logic circuitry 1006 where the distortion is removed if the distortion is above the threshold. More particularly, circuitry 1003 passes this indication to remove, or not to remove distortion to circuitry 1006.

The resulting signal is output from circuitry 1006 and passed to channel estimation and equalization circuitry 1007. As discussed above, a pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. Circuitry 1007 performs channel estimation on the occupied sub-carriers for the data block utilizing at least received pilot blocks. Circuitry 1007 also equalizes the data blocks on the occupied sub-carriers. Due to potential DC sub-carrier distortion, in one embodiment the circuitry 1007 ignores or sets to zero the received signal on the DC sub-carrier. In another embodiment, circuitry 1007 may tolerate the distortion on the DC sub-carrier. In another embodiment, the circuitry 1007 may apply a weighting factor to the received signal on the DC sub-carrier (such as multiplying by a value less than 1) to reduce the influence of the distortion on the DC sub-carrier.

Circuitry 1007 may also perform advanced equalization techniques to cancel or lessen the impact of the distortion on the DC sub-carrier due to local oscillator leakage. The signal output from circuitry 1007 comprises an appropriately equalized data signal that is passed to a user separation circuit 1008 where an individual user's signal is separated from the data signal (the transmission from a single user corresponds to a transmission from each transmitter at the user). The user separation can be performed in the time-domain or frequency-domain and can be combined with the equalization circuitry 1007. A decision device 1009 determines the symbols/bits from the user-separated signal.

Figure 11:
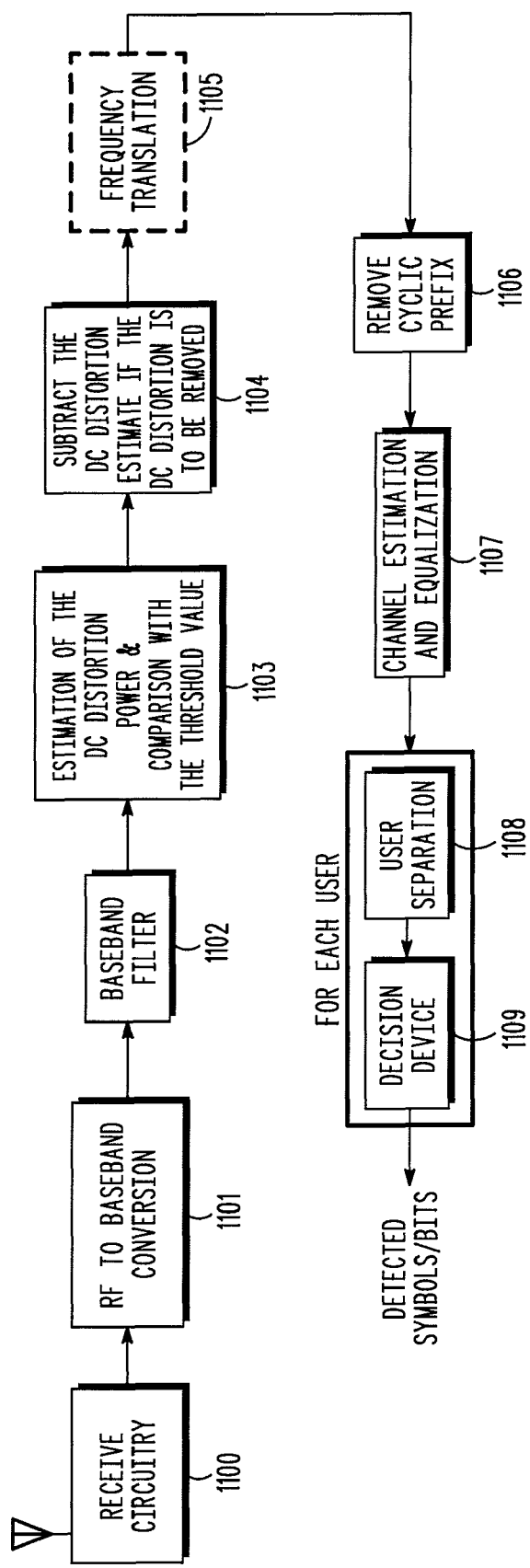
FIG. 11 is a block diagram of a receiver with time-domain DC suppression.

FIG. 11 is a receiver block diagram having time-domain DC suppression. Receive circuitry 1100 receives a composite of the channel distorted transmit signal from all the transmitters. During operation, the received signal is converted to baseband by baseband conversion circuitry 1101 and baseband filtered via filter 1102. Logic circuitry 1103 is provided to estimate the DC distortion power and compare with a threshold value. As discussed above, the distortion will be removed if the amount of DC distortion is above a threshold. The data and pilot blocks are passed to circuitry 1104 where the distortion is removed if the distortion is above the threshold. In one embodiment, frequency translation takes place in frequency-translation circuitry 1105 if transmit signals from the mobile terminals is frequency shifted by a fraction of the sub-carrier spacing before transmission. This frequency translation at the receiver can be equivalent to multiplication by $\exp(-j2\pi\Delta ft)$, where $\Delta f$ is the desired shift, and is the inverse of the operation performed at the transmit side in the case. For the case when no frequency shift by a fraction of the sub-carrier is performed in the mobile terminals, frequency-translation circuitry 1105 is skipped. The cyclic prefix is removed from the pilot and data blocks via cyclic prefix removal circuitry 1106.

The resulting signal is output from circuitry 1106 and passed to channel estimation and equalization circuitry 1107. As discussed above, a pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. Circuitry 1107 performs channel estimation on the occupied sub-carriers for the data block utilizing at least received pilot blocks. Circuitry 1107 also equalizes the data blocks on the occupied sub-carriers. Due to potential DC sub-carrier distortion, in one embodiment the circuitry 1107 ignores or sets to zero the received signal on the DC sub-carrier. In another embodiment, circuitry 1107 may tolerate the distortion on the DC sub-carrier. In another embodiment, the circuitry 1107 may apply a weighting factor to the received signal on the DC sub-carrier (such as multiplying by a value less than 1) to reduce the influence of the distortion on the DC sub-carrier.

Circuitry 1107 may also perform advanced equalization techniques to cancel or lessen the impact of the distortion on the DC sub-carrier due to local oscillator leakage. The signal output from circuitry 1107 comprises an appropriately equalized data signal that is passed to a user separation circuit 1108 where an individual user's signal is separated from the data signal (the transmission from a single user corresponds to a transmission from each transmitter at the user). The user separation can be performed in the time-domain or frequency-domain and can be combined with the equalization circuitry 1107. A decision device 1109 determines the symbols/bits from the user-separated signal.

Figure 12:
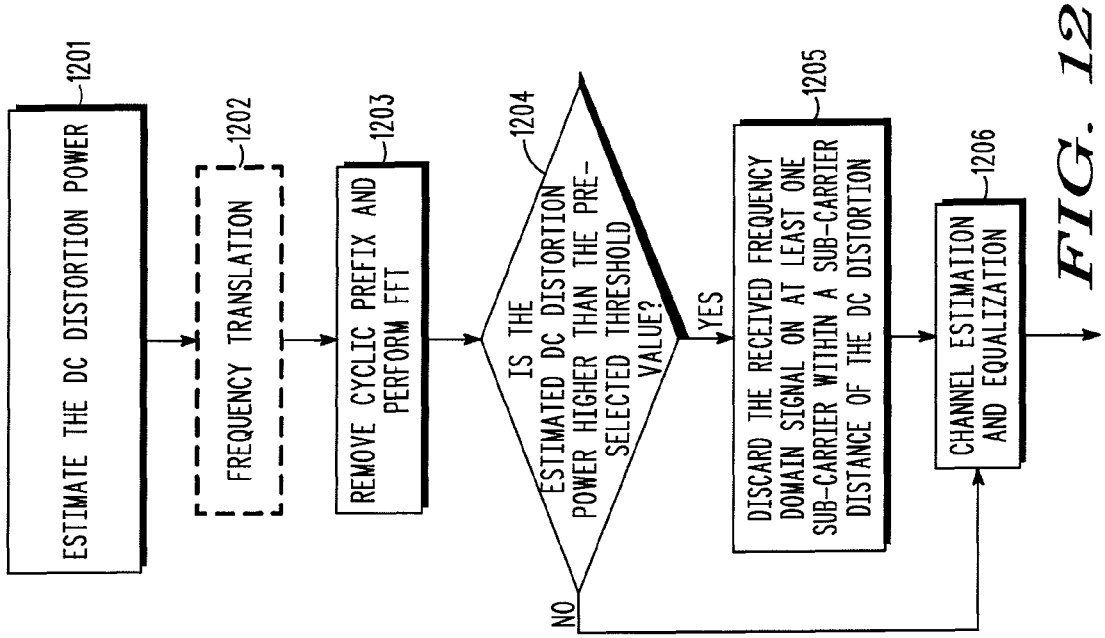
FIG. 12 is a flow chart showing operation of the equalizer of FIG. 10.

FIG. 12 is a flow chart showing operation of the receiver of FIG. 10. The logic flow begins at step 1201 where a receiver has already received a composite signal. At step 1201, circuitry 1003 estimates the DC distortion power by using the received baseband time-domain signal. As discussed, the DC distortion comprises an amount of distortion existing on a sub-carrier of a resource block of sub-carriers. The received signal comprises a composite signal within a channel bandwidth, wherein the composite signal comprises a channel impaired SC-FDMA transmit signal from at least a first wireless communication terminal transmitting on a first set of sub-carriers. As discussed, the first set of sub-carriers may comprise a sub-carrier within a sub-carrier distance of the DC distortion. The DC distortion may exist substantially halfway between two adjacent sub-carrier locations of the first set of sub-carriers, or substantially coincident with a sub-carrier location of the first set of sub-carriers.

The DC distortion power can be determined in time-domain or frequency-domain, where a location of the DC distortion corresponds to a radio frequency carrier frequency of at least the first wireless communication terminal and a receiver processing the received composite signal. For the case when the transmit signals from the mobile terminals is frequency shifted by a fraction of the sub-carrier spacing before transmission, the frequency shift is undone in the receiver by translation circuitry 1004 (step 1202). For the case when no frequency shift by a fraction of the sub-carrier is performed in the mobile terminals, step 1202 is skipped. Cyclic prefix removal and FFT are done at step 1203. Note that cyclic prefix removal can also be performed before step 1201 and/or 1202.

Circuitry 1003 then compares the estimated/measured DC distortion power with a pre-selected DC power threshold at step 1204 and determines whether or not to remove the DC distortion based on the amount of DC distortion. In one embodiment, the threshold value is based on a characteristic of the first set of subcarriers, wherein the characteristic is one or more of the number of subcarriers in the first set of sub-carriers, modulation order of the first set of subcarriers, and location of the DC distortion relative to the first set of sub-carriers. In another embodiment, the threshold value is based on a characteristic of a equalizer employed within the receiver, wherein the characteristic is one or more a frequency domain equalizer, a time-domain equalizer, a decision feedback equalizer, an iterative equalizer, an ISI canceller, a turbo equalizer, and a maximum likelihood sequence estimator. If the DC power is higher than the threshold value, the received frequency-domain signal on at least one sub-carrier near DC is removed by circuitry 1006 at step 1205 and the logic flow continues to step 1206 where the channel estimator and/or the equalizer does not exploit discarded sub-carriers for detection. If, however, at step 1204, the DC power is not higher than the threshold value, the logic flow continues to step 1206 where normal channel estimation/equalization takes place.

The step of removing the DC distortion may comprise discarding one or more sub-carriers located within substantially ½ sub-carrier of the DC distortion, wherein the sub-carriers discarded comprises reference signal sub-carriers used for coherent demodulation. Additionally, the step of removing the DC distortion may comprise removing a portion of the DC distortion from each of the sub-carriers from the first set of sub-carriers and/or removing the DC distortion in a time domain. The step of removing the DC distortion in the time domain may comprise estimating the DC distortion by averaging at least a portion of a received baseband composite signal, and subtracting the DC distortion estimate from the received baseband composite signal. The step of removing the DC distortion in the time domain may also comprise removing the DC distortion before a ½ sub-carrier frequency translation of the received composite signal, and/or removing the DC distortion before frequency domain transformation of the received composite signal.

Figure 13:
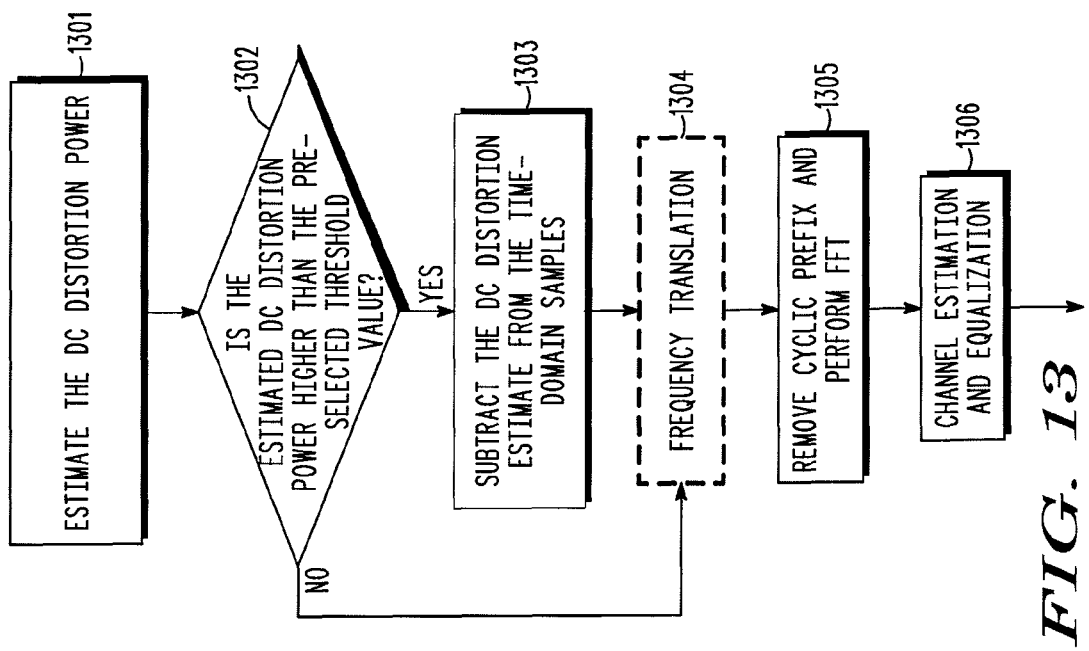
FIG. 13 is a flow chart showing operation of the equalizer of FIG. 11.

FIG. 13 is a flow chart showing operation of the receiver of FIG. 13. In this logic flow sub-carriers may be discarded only on pilot blocks. If the DC power is lower than the threshold value, equalization is performed without discarding any sub-carriers. For time-domain DC suppression, the DC distortion power is estimated, measured, or observed by circuitry 1103, and compared with the threshold value at step 1301. A determination is made circuitry 1103 whether or not the distortion power is larger than the threshold (step 1302). If so, the DC distortion estimated by taking the average of the time-domain signal, is subtracted from the time-domain received baseband signal by circuitry 1104 (step 1303) otherwise the logic flow continues to step 1304 where frequency translation takes place with circuitry 1105. Frequency translation to undo the fractional sub-carrier frequency shift in the transmitter is performed only for the case of frequency shift when the transmit signals from the mobile terminals is frequency shifted by a fraction of the sub-carrier spacing before transmission. For the case when no frequency shift by a fraction of the sub-carrier is performed in the mobile terminals, step 1304 is skipped. Cyclic prefix removal, and FFT are performed at step 1305 by circuitry 1106 and channel estimation and/or equalization is performed for the frequency-domain signal at step 1306 via circuitry 1107.

In one embodiment, the one or more discarded subcarriers comprise reference signal sub-carriers used for coherent demodulation which may be replaced by a subcarrier dependent weighted sum of the non-discarded subcarriers within the radio resource allocation of a wireless communication terminal prior to channel estimation. For channel estimation, in another embodiment, the received reference or pilot signal located within a sub-carrier spacing distance of the DC sub-carrier may be replaced by the received reference signal on a sub-carrier with equal to or larger than a sub-carrier spacing distance to the DC sub-carrier before it is fed to channel estimators if the DC sub-carrier is located on the edge or near the edge of allocated consecutive sub-carriers. If the DC sub-carrier is one of interior sub-carriers of allocated resource blocks, the received reference signal on the DC sub-carrier may be replaced by the average value of two reference signals on adjacent sub-carriers which are located on each side of the DC sub-carrier, or replaced by the weighted sum of several reference signals on sub-carriers near the DC sub-carrier. If the DC sub-carrier is located within a sub-carrier spacing distance of one of interior sub-carriers of allocated resource blocks, the received reference signals on sub-carriers with a sub-carrier spacing or less than a sub-carrier spacing distance to the DC sub-carrier may be replaced by the weighted sum of several reference signals on sub-carriers near the DC sub-carrier.

The threshold value determining whether to use the reference signal located within a sub-carrier spacing distance of the DC sub-carrier or not for channel estimation, i.e. for the pilot blocks may be different from the threshold value for whether to perform DC suppression for the data blocks. Either time-domain or frequency-domain DC suppression, or combination of time- and frequency-domain DC suppression may be performed depending on whether the fractional sub-carrier frequency shift was performed in the transmitters and/or on the number and location of the DC distortion locations, etc.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims. In particular, there are other embodiments where the ½ sub-carrier shift is not present. In that case DC may lie directly on a sub-carrier of a resource block. Alternatively, may add a DC sub-carrier. In either case, thresholds may be different but same principle applies.

The invention claimed is:

1. A method comprising the steps of:
    receiving a composite signal within a channel bandwidth, wherein the composite signal comprises a channel impaired SC-FDMA transmit signal from at least a first wireless communication terminal transmitting on a first set of sub-carriers;
    determining an amount of DC distortion, wherein a location of the DC distortion correspond to a radio frequency carrier frequency of at least the first wireless communication terminal and a receiver processing the received composite signal;

determining whether or not to remove the DC distortion based on the amount of DC distortion; and if the DC distortion is to be removed, removing the DC distortion wherein the DC distortion is a fraction of a sub-carrier spacing away from a nominal center frequency of a sub-carrier of the first set of sub-carriers and wherein the sub-carrier spacing is a distance between nominal center frequencies of two adjacent sub-carriers of the first set of sub-carriers.

2. The method of claim 1 wherein the DC distortion comprises an amount of distortion existing on a sub-carrier of a resource block of sub-carriers.

3. The method of claim 1 wherein the first set of sub-carriers comprises a sub-carrier within a sub-carrier distance of the DC distortion.

4. The method of claim 1 wherein the DC distortion is halfway between two adjacent sub-carrier locations of the first set of sub-carriers.

5. The method of claim 1, further comprising,
determining the amount of the DC distortion based on one or more of a number of the wireless communication terminals, allocation bandwidth of the wireless communication terminals, power control target, estimate of the DC distortion introduced by each wireless communication terminal and the receiver.

6. The method of claim 1 wherein the step of removing the DC distortion comprises discarding one or more sub-carriers located within a fraction of a sub-carrier of the DC distortion.

7. The method of claim 6, wherein the sub-carriers discarded comprises reference signal sub-carriers used for coherent demodulation.

8. The method of claim 1 wherein the step of removing the DC distortion comprises removing a portion of the DC distortion from each of the sub-carriers from the first set of sub-carriers.

9. The method of claim 1 wherein the step of removing the DC distortion comprises removing the DC distortion in a time domain.

10. The method of claim 9 wherein the step of removing the DC distortion in the time domain comprises the steps of: estimating the DC distortion by averaging at least a portion of a received baseband composite signal; subtracting the DC distortion estimate from the received baseband composite signal.

11. The method of claim 9 wherein the step of removing the DC distortion in the time domain is performed before a fraction of sub-carrier frequency translation of the received composite signal.

12. The method of claim 9 wherein the step of removing the DC distortion in the time domain is performed before frequency domain transformation of the received composite signal.

13. An apparatus comprising:
a receiver receiving a composite signal within a channel bandwidth, wherein the composite signal comprises a channel impaired SC-FDMA transmit signal from at least a first wireless communication terminal transmitting on a first set of sub-carriers;

circuitry for determining an amount of DC distortion, wherein a location of the DC distortion correspond to a radio frequency carrier frequency of at least the first wireless communication terminal and a receiver processing the received composite signal;

circuitry for determining whether or not to remove the DC distortion based on the amount of DC distortion and if the DC distortion is to be removed, circuitry for removing the DC distortion by discarding one or more sub-carriers located within a fraction of a sub-carrier spacing from the DC distortion and wherein the sub-carrier spacing is a distance between nominal center frequencies of two adjacent sub-carriers of the first set of sub-carriers.

14. The apparatus of claim 13 wherein the DC distortion comprises an amount of distortion existing on a sub-carrier of a resource block of sub-carriers.

15. The apparatus of claim 13 wherein the first set of sub-carriers comprises a sub-carrier within a sub-carrier distance of the DC distortion.

16. The apparatus of claim 13 wherein the DC distortion is substantially halfway between two adjacent sub-carrier locations of the first set of sub-carriers.

17. The apparatus of claim 13 wherein the step of removing the DC distortion comprises discarding one or more sub-carriers located within substantially ½ sub-carrier-spacing from the DC distortion.

18. The apparatus of claim 17, wherein the sub-carriers discarded comprises reference signal sub-carriers used for coherent demodulation.

19. The apparatus of claim 13 wherein the step of removing the DC distortion comprises removing a portion of the DC distortion from each of the sub-carriers from the first set of sub-carriers.

20. A method comprising the steps of:
receiving a composite signal within a channel bandwidth, wherein the composite signal comprises a channel impaired SC-FDMA transmit signal from at least a first wireless communication terminal transmitting on a first set of sub-carriers;

removing DC distortion by discarding one or more sub-carriers located within a fraction of a sub-carrier spacing from the DC distortion wherein a location of the DC distortion correspond to a radio frequency carrier frequency of at least one of the first wireless communication terminal and a receiver processing the received composite signal and wherein the sub-carrier spacing is a distance between nominal center frequencies of two adjacent sub-carriers of the first set of sub-carriers.

21. The method of claim 20 wherein the DC distortion is halfway between two adjacent sub-carrier locations of the first set of sub-carriers.

22. The method of claim 20, further comprising,
determining an amount of the DC distortion; removing the DC distortion based on the determined amount of the DC distortion.

* * * * *